US011351646B1

(12) United States Patent
Lark (10) Patent No.: US 11,351,646 B1
(45) Date of Patent: Jun. 7, 2022

(54) RING HOLDING FIXTURE AND ACCESSORY SYSTEM

(71) Applicant: David B. Lark, Kingsley, MI (US)

(72) Inventor: David B. Lark, Kingsley, MI (US)

( * ) Notice: Subject to any disclaimer, the term of this patent is extended or adjusted under 35 U.S.C. 154(b) by 0 days.

(21) Appl. No.: 17/128,022

(22) Filed: Dec. 19, 2020

Related U.S. Application Data (60) Provisional application No. 62/950,205, filed on Dec. 19, 2019.

(51) Int. Cl.
*B44B 3/04* (2006.01)
*B23Q 37/00* (2006.01)
*B44B 3/06* (2006.01)
*B23B 31/40* (2006.01)
*A44C 27/00* (2006.01)

(52) U.S. Cl.
CPC ......... *B23Q 37/002* (2013.01); *B23Q 37/005* (2013.01); *B44B 3/04* (2013.01); *B44B 3/065* (2013.01); *A44C 27/00* (2013.01); *B23B 31/4013* (2013.01); *B23B 31/4033* (2013.01); *Y10T 29/49593* (2015.01)

(58) Field of Classification Search
CPC ...... B23Q 37/002; B23Q 37/005; B44B 3/04; B44B 3/065; A44C 27/00; B23B 31/4013; B23B 31/4033; Y10T 29/49593
See application file for complete search history.

(56) References Cited

U.S. PATENT DOCUMENTS

| | | | | |
|---|---|---|---|---|
| 4,285,505 A | * | 8/1981 | Winzelberg | A44C 27/00 269/50 |
| 4,295,640 A | * | 10/1981 | Merrell | A44C 27/00 29/896.411 |
| 4,785,647 A | * | 11/1988 | Coleman | B21H 1/06 72/74 |
| 7,290,760 B1 | | 11/2007 | Lindsay | |

(Continued)

OTHER PUBLICATIONS

Steve Lindsay Engraving Tools, Metal Engraving Tool News, webpage (https://www.airgraver.com/news.htm), Jan. 21, 2020 (entries prior to Rick Simmons Friction Templates believed approx Oct. 2019 or earlier, based an web archive), 16 pages, Steve Lindsay (www.airgraver.com), U.S.

(Continued)

*Primary Examiner* — Ryan J. Walters
(74) *Attorney, Agent, or Firm* — Mitchell Intellectual Property Law, PLLC (57) ABSTRACT

A ring holder system comprising a ring holder base with a body that can be oriented horizontally and vertically on a flat work surface. The base includes a single mandrel extending from a front end face of the base, angled upper tool mounting surfaces circumferentially offset from a top surface of the base, and a flat rear end face for resting the base in a vertical work orientation on a flat surface. A horizontal tool adapter mount is configured to be removably mounted on one of the angled upper tool mounting surfaces, and a vertical tool adapter is configured to be mounted on the bottom surface of the base in the vertical work orientation.

(Continued)

The mandrel includes a threaded mounting ring at an inner end of the mandrel adjacent the front end face of the base for mounting accessories such as vises and pitch cups rotatably on the mandrel in the vertical work orientation.

8 Claims, 12 Drawing Sheets

(56) References Cited

U.S. PATENT DOCUMENTS

| | | | |
|---|---|---|---|
| 7,300,043 B1 | 11/2007 | Lindsay et al. | |
| 8,172,234 B2 * | 5/2012 | Bernhardt | B23B 31/20 |
| | | | 269/69 |
| 8,479,372 B2 | 7/2013 | Lark et al. | |
| 9,448,537 B2 | 9/2016 | Lindsay et al. | |
| 10,023,002 B2 * | 7/2018 | Hyde | B44B 3/065 |
| 10,471,768 B1 | 11/2019 | Lindsay | |

OTHER PUBLICATIONS

GRS, ID Ring Holder, webpage (https://www.grs.com/product/004-735-id-ring-holder/), Jul. 30, 2019, 5 pages, GRS (www.grs.com), U.S.

* cited by examiner

RING HOLDING FIXTURE AND ACCESSORY SYSTEM

RELATED APPLICATIONS/PRIORITY BENEFIT CLAIM

This application claims the benefit of U.S. Provisional Application No. 62/950,205, filed Dec. 19, 2019 by the same inventor (Lark), the entirety of which provisional application is hereby incorporated by reference.

FIELD

The subject matter of the present application is in the field of fixtures for securely holding rings while jewelers work on them.

BACKGROUND

Ring holding fixtures (ring holders) are commonly used by jewelers to secure rings for work such as engraving, stone setting, cleaning, and other tasks known to those skilled in the art (hereafter "engraving").

U.S. Pat. No. 8,479,372 to Lark et al. discloses a ring holder comprising a vise-securable fixture base with opposing mandrels connected through spaced arms to rotatably hold a ring between them at a ring-engraving location. The mandrels are each provided with an independent set of detents with different degrees of rotational spacing. The fixture base has a tool-supporting bridge connected between the spaced arms above the ring-engraving location, the bridge designed to hold an engraving tool orthogonally to the ring axis. A sliding tool support is also provided on the bridge.

The ring holder shown in the Lark et al '372 patent is a very good fixture that has been well received in the ring-engraving industry. However, while the use of opposed, mating mandrels to hold the ring between the spaced arms of the fixture base provides exceptional stability and control over the ring during fine engraving operations, access to the ring at certain angles and for certain procedures can be hampered.

Single-mandrel ring holders are known, but generally lack versatility in use, and are typically designed to be used horizontally, i.e. with the ring axis horizontal. Moreover, prior single-mandrel ring holders generally do not seem to be well-suited to working with commonly used jeweler's accessories such as fixture-mounted scribes, vises, knurling tools, and pitch cups.

BRIEF SUMMARY

The present invention is a ring holder with a base configured to be used both horizontally and vertically with minimal adjustment, and configured to mount a number of tools in both horizontal and vertical work orientations.

The ring holder base comprises a main body with a top, a bottom, front and rear end faces, and sides with upper angled mounting surfaces. A rotatable collet-holding mandrel extends from the front end face of the base, and can be manually rotated by a knob or handle extending from the rear end face.

The rear end face is substantially flat so that the base may rest on it in a vertical work orientation with the mandrel-rotating handle removed. The bottom of the base includes a tool-mounting feature for mounting one or more tools vertically thereon when the base is in the vertical work orientation.

In one form the ring holder base includes a mandrel-rotating handle in the form of a wheel having a diameter greater than a height and/or width of the base, the wheel handle's axis of rotation (and the axis of the mandrel) being offset relative to the height of the base to allow for free rotation when the base is horizontal.

The angled mounting faces on the sides of the base include tool-mounting features configured to removably receive a tool or tool-mount thereon, with a lateral offset relative to the top of the base and with a tool end extending out longitudinally beyond the front end face to engage a ring held on the mandrel.

In one form, a horizontal tool mount or adapter comprising a stepped cantilever beam is secured to one of the angled mounting faces. The tool mount comprises a longitudinal outer tool-receiving groove for receiving a variety of tools therein with a slide-adjustable fit. The outer tool-receiving groove may extend through a free end of the beam adjacent the mandrel to allow a tool to extend therethrough. One such tool is an adjustable scribe. Another such tool is a knurling tool.

The tool-mounting feature on the bottom of the ring holder base in one form comprises a dovetail type channel. A vertical scribe tool is provided to engage the dovetail channel in the bottom of the ring holder base when the base is vertical.

In a further form, a rotatable vise and a rotatable pitch cup are provided for rotating engagement with the end of the ring-holding mandrel when the ring holder base is in the vertical orientation.

These and other features and advantages of the invention will become apparent from the detailed description below, in light of the accompanying drawings.

DETAILED DESCRIPTION

Figure 1:
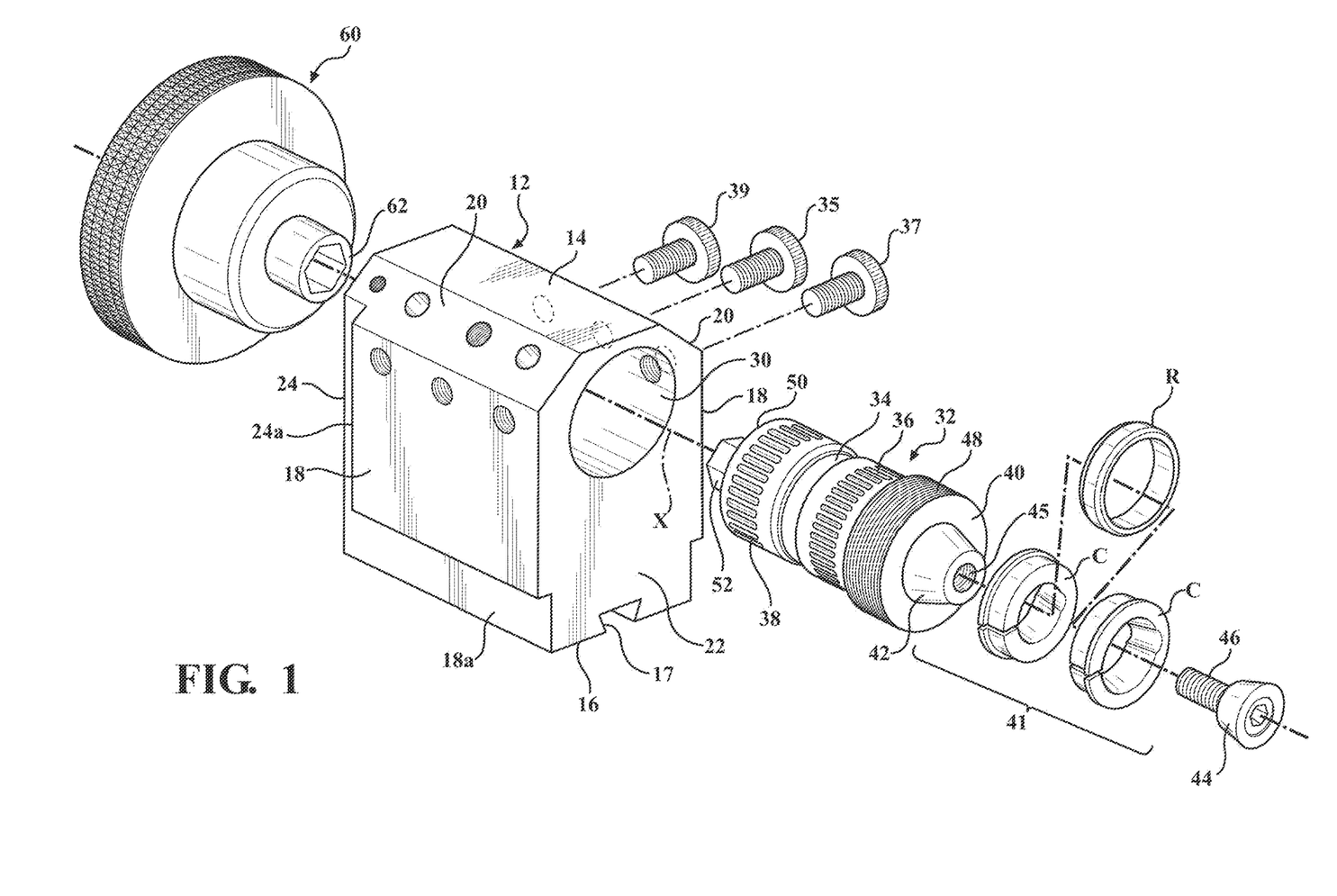
FIG. 1 is a front perspective view of a ring holder base according to the invention, in a horizontal work orientation and with handle and ring-holding portions exploded from the base.
Figure 2:
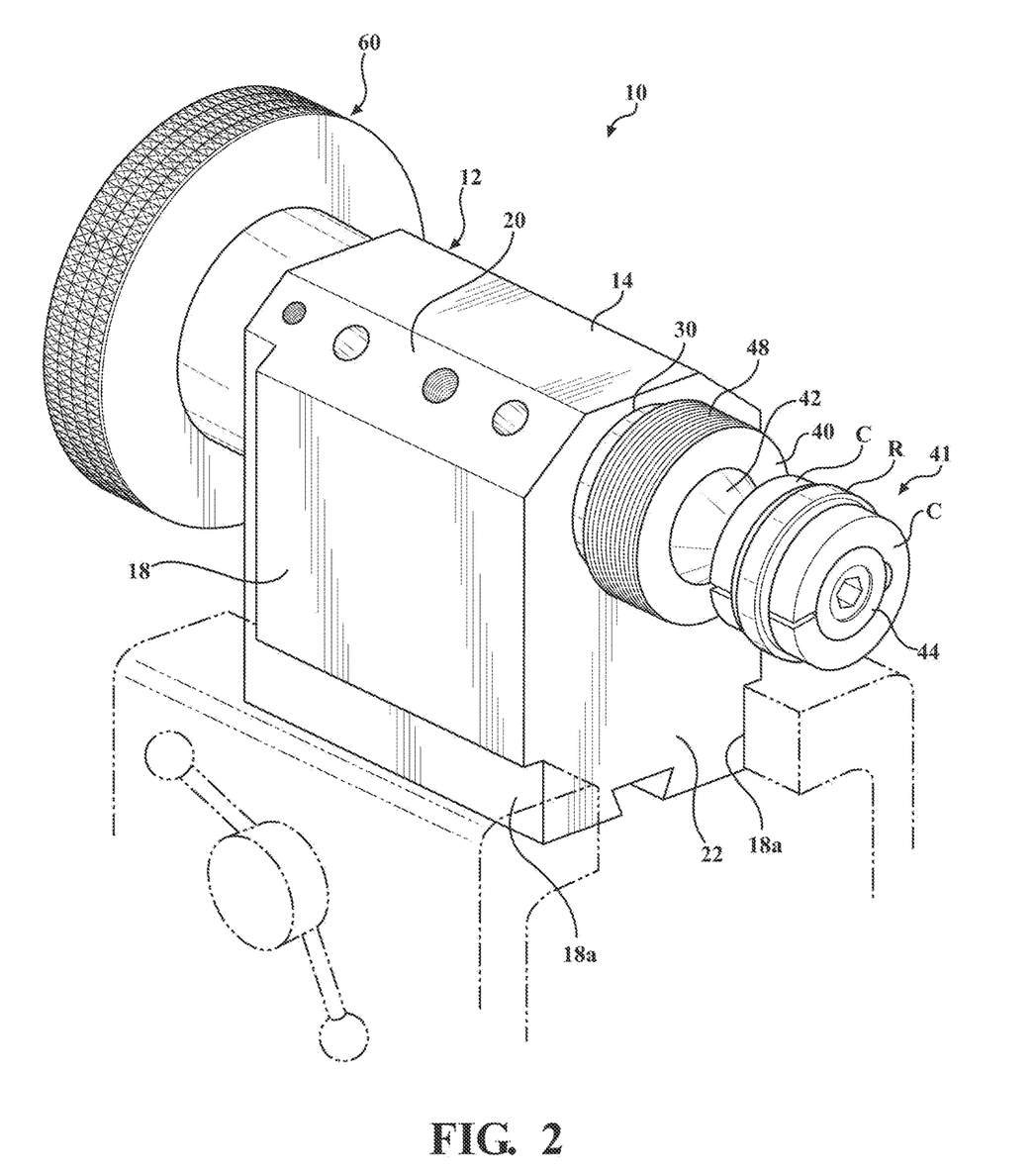
FIG. 2 shows the ring holder base of FIG. 1 with handle and ring-holding portions assembled.

Referring first to FIGS. 1 and 2, a ring holder 10 is shown in exemplary form in order to teach how to make and use the claimed invention. Ring holder 10 includes a generally rectangular body or base 12, for example milled or cast from aluminum or stainless steel, with a top 14, a bottom 16, sides 18, angled tool mounting faces 20 on sides 18 adjacent top 14, a front end face 22, and a rear end face 24. Bottom 16 has a longitudinal groove 17 for a purpose described below.

Base 12 includes a longitudinal bore 30 having a sufficient diameter to receive a mandrel shaft 32 therethrough, and threaded holes 33 formed in at least one side 18 for receiving adjustment screws 35, 37, and 39 through the side wall of the base so that inner ends of the adjustment screws engage corresponding portions of the shaft 32 for a journaled rotating support of the shaft in the base. Screw 35 engages a bearing groove 34 extending around the circumference of the mandrel shaft, screw 37 selectively engages a front detent ring 36 on the mandrel shaft, and screw 39 selectively engages a rear detent ring 38 on the mandrel shaft. Screws 35, 37, and 39 may be spring-biased in base 12 in known manner for tensioned engagement with their respective parts of the mandrel shaft 32, or they may engage spring detents formed in the side walls 18 of the base in known manner to selectively engage the detents with their respective portions of the mandrel shaft when the mandrel shaft 32 is inserted in bore 30.

The mandrel end 40 of mandrel shaft 32 associated with front end face 22 of the base comprises a mandrel assembly 41 having a smooth-surfaced tapered mandrel base 42, a smooth-surfaced tapered removable mandrel tip 44 with a threaded stud 46 for longitudinally adjustable engagement with mandrel base 42 via a matching threaded socket 45 formed in the center of the mandrel base. The mandrel end 40 of shaft 32 includes a threaded mounting ring or surface 48 of greater diameter than mandrel base 42 and mandrel tip 44. Expanding ring-holding collets C of known type may be secured under expanded tension on mandrel base 42 with mandrel tip 44 in known manner with a ring R secured between them.

The end 50 of drive shaft 32 associated with rear end face 24 of base 12 includes a drive stem 52 configured to removably receive a handle 60 for rotating the mandrel shaft 32. The length of mandrel drive shaft 32 and stem 52 rearwardly of mounting ring 48 is preferably less than or equal to the length of bore 30, as illustrated, such that drive stem 52 is recessed in bore 30 relative to rear end face 24 when the mandrel shaft is inserted in bore 30, and further such that when handle 60 is removed the rear end face 24 is substantially flat even with the mandrel shaft fully inserted in the bore. In the illustrated example drive stem 52 has a hex cross-section, which fits snugly into a mating hex-shaped recess 62 on the inner end of handle 60 so that the handle can transmit rotational force to the drive shaft 32. Handle 60 may be removably locked to drive stem 52 with a set screw (not shown) or similar.

In the illustrated example, handle 60 has a diameter greater than the width of base 12 between sides 18, and/or greater than the height of base 12 from either the bottom 16 or the bottom of sides 18 above cutouts 18a. In order to accommodate this diameter, the longitudinal center axis X of bore 30 and mandrel 32 through base 12 is offset vertically above the midpoint or centerline of the height of base 12 so that handle 60 is spaced above any flat surface on which bottom 16 or the recessed shoulders at the bottom of sides 18 may rest during horizontal use on a flat surface, for example as shown in FIG. 2. Sides 18 are recessed near bottom 16 to form cutouts 18a configured to be clamped by the jaws of a vise in a horizontal work position in known manner. The sides of rear face 24 may be similarly recessed at 24a for clamping the base 12 between the jaws of a vise in a vertical work position.

Figure 3:
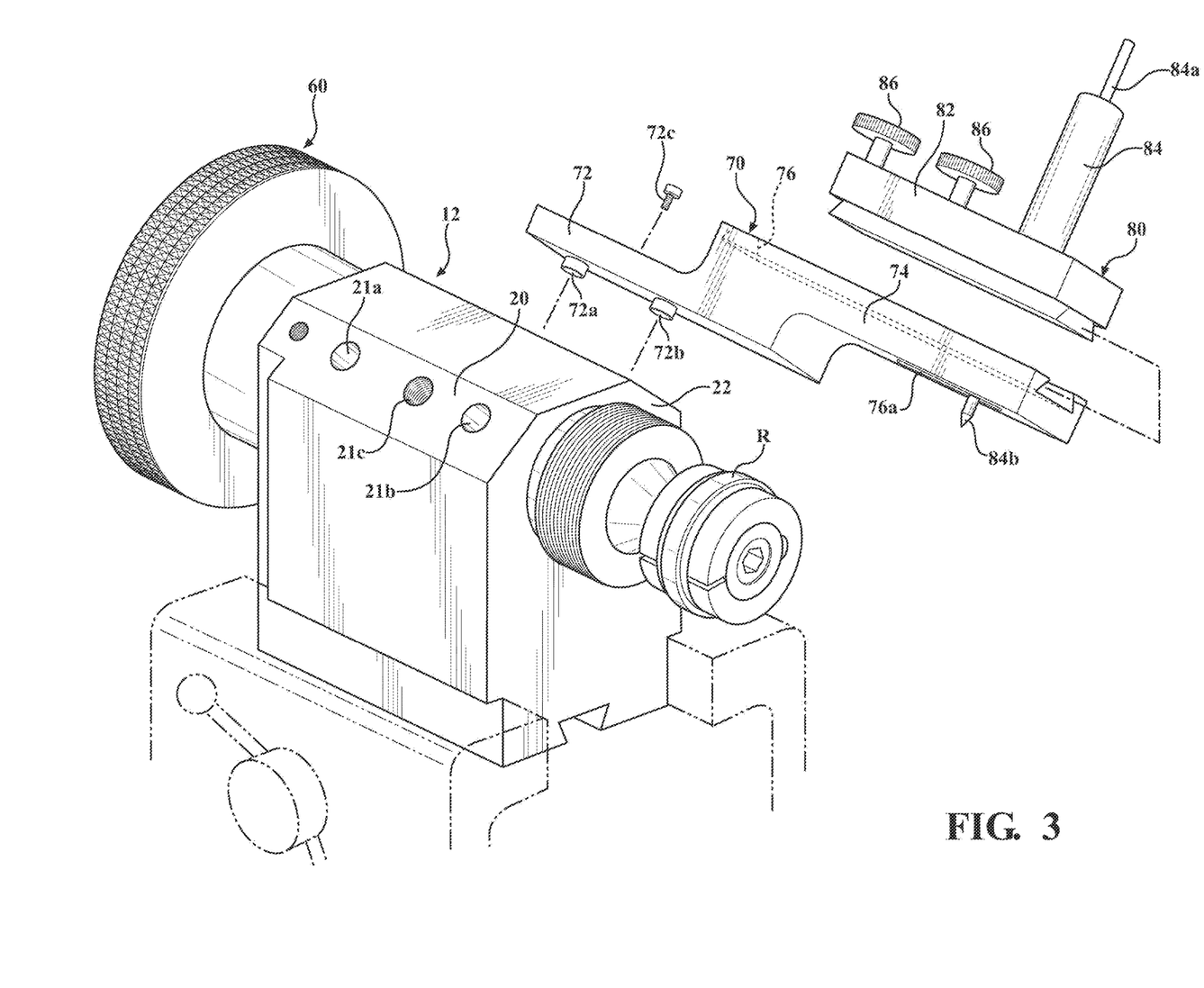
FIG. 3 is similar to FIG. 2, but shows a horizontal tool adapter and scribe tool exploded from the ring holder.

Referring to FIG. 3, tool mounting faces 20 include features for removably mounting a cantilever horizontal tool adapter 70 at a circumferentially-angled offset from the top centerline X of base 12. In the illustrated example, these tool mounting features include differently-sized stud locating holes 21a and 21b for receiving matching locating studs 72a and 72b on a base portion 72 of adapter 70, and one or more threaded sockets 21c for receiving one or more threaded lock screws 72c on base portion 72 of adapter 70. The tool-mounting features may vary depending on the desired attachment of a tool to the base, and are not limited to those illustrated.

Horizontal tool adapter 70 includes a stepped, vertically offset cantilever tool-support arm 74 that extends beyond front end face 22 of base 12 when base portion 72 of the adapter is secured to one of tool-mounting faces 20. Support arm 74 includes a longitudinal, preferably dovetail groove 76 with an open bottom 76a at least at its outer end toward the tip of the arm where it overlies mandrel assembly 40.

Figure 3A:
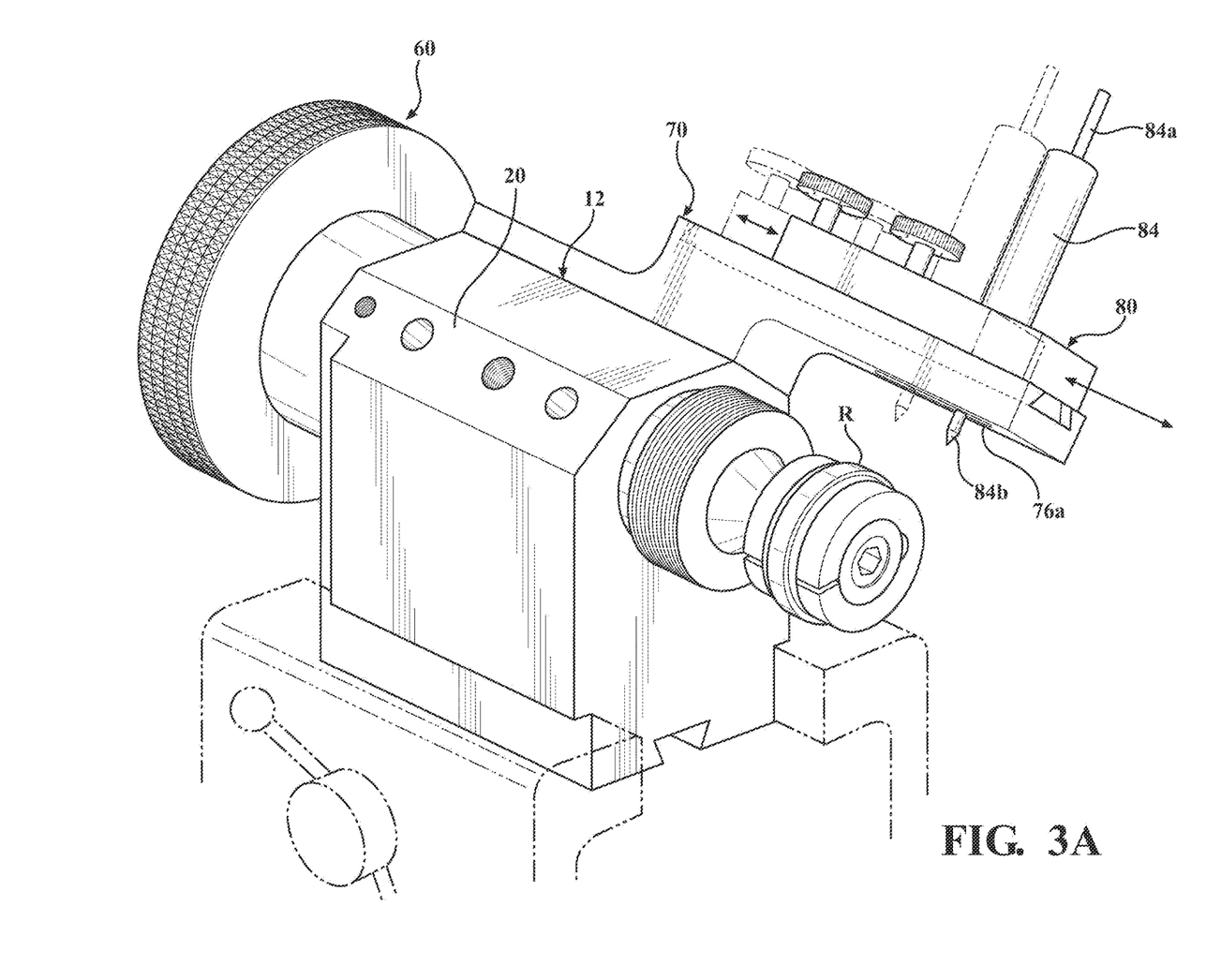
FIG. 3A shows the horizontal tool adapter and scribe tool of FIG. 3 assembled to the ring holder.

Referring to FIGS. 3 and 3A, various tools such as a scribing tool 80 may be mounted in the groove 76 on adapter 70 to be slidingly positioned over a ring R held on the mandrel. Scribing tool 80 in the illustrated example comprises a sliding block body 82 with a scribe 84 of known type whose plunger 84a is manually pushed down against a spring inside the body of scribing tool 80 to extend a hardened tip 84b against the surface of the ring. Locking screws 86 may be provided in apertures 87 extending through the body 82 of the scribe to engage adapter 74 in or adjacent groove 76 to longitudinally adjust and then secure the position of the scribe 84 in different positions along the cantilever arm 74 of tool adapter 70 over ring R.

Figure 4:
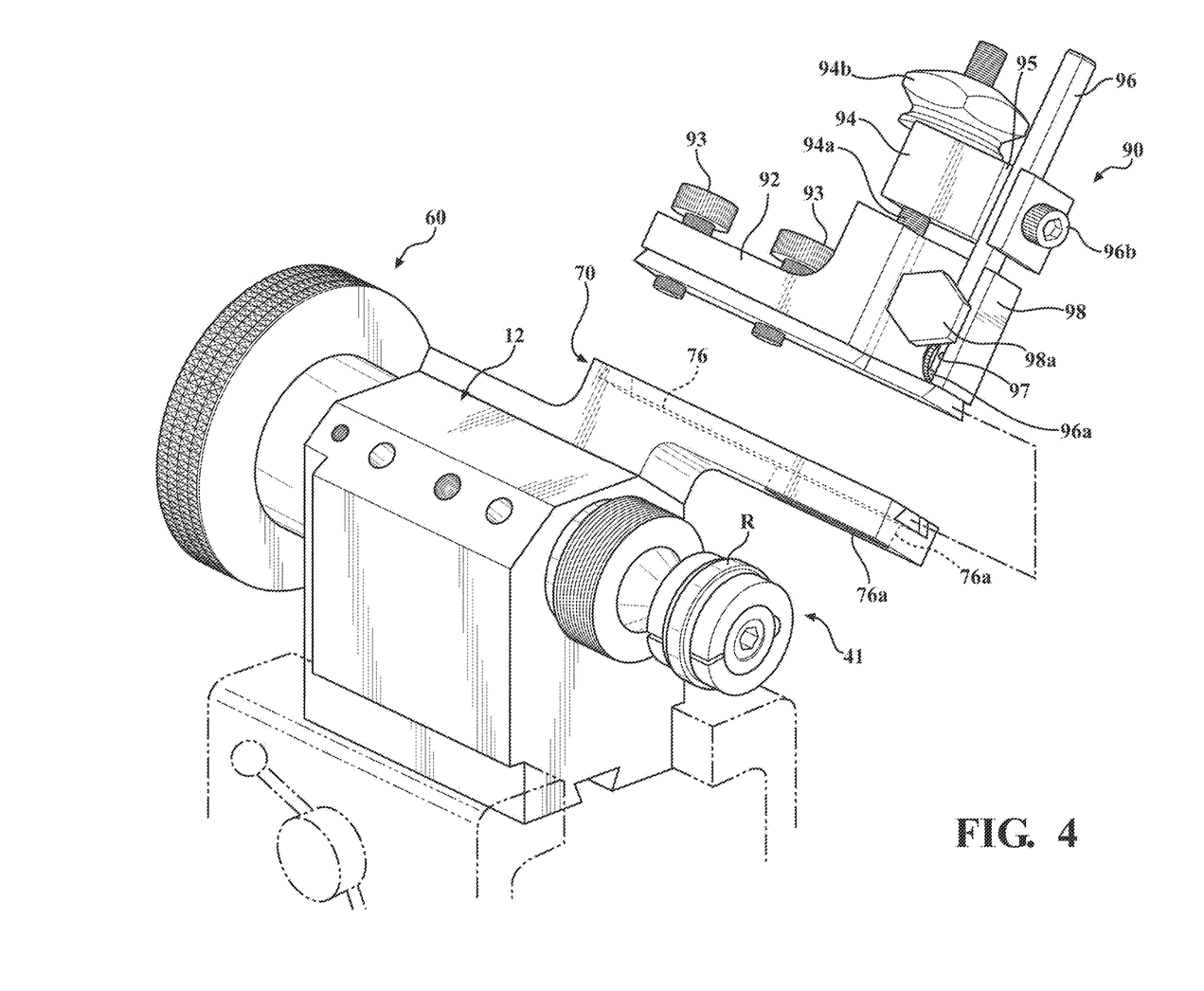
FIG. 4 is similar to FIG. 3, but shows a horizontal knurling tool exploded from the tool adapter on the ring holder.
Figure 4A:
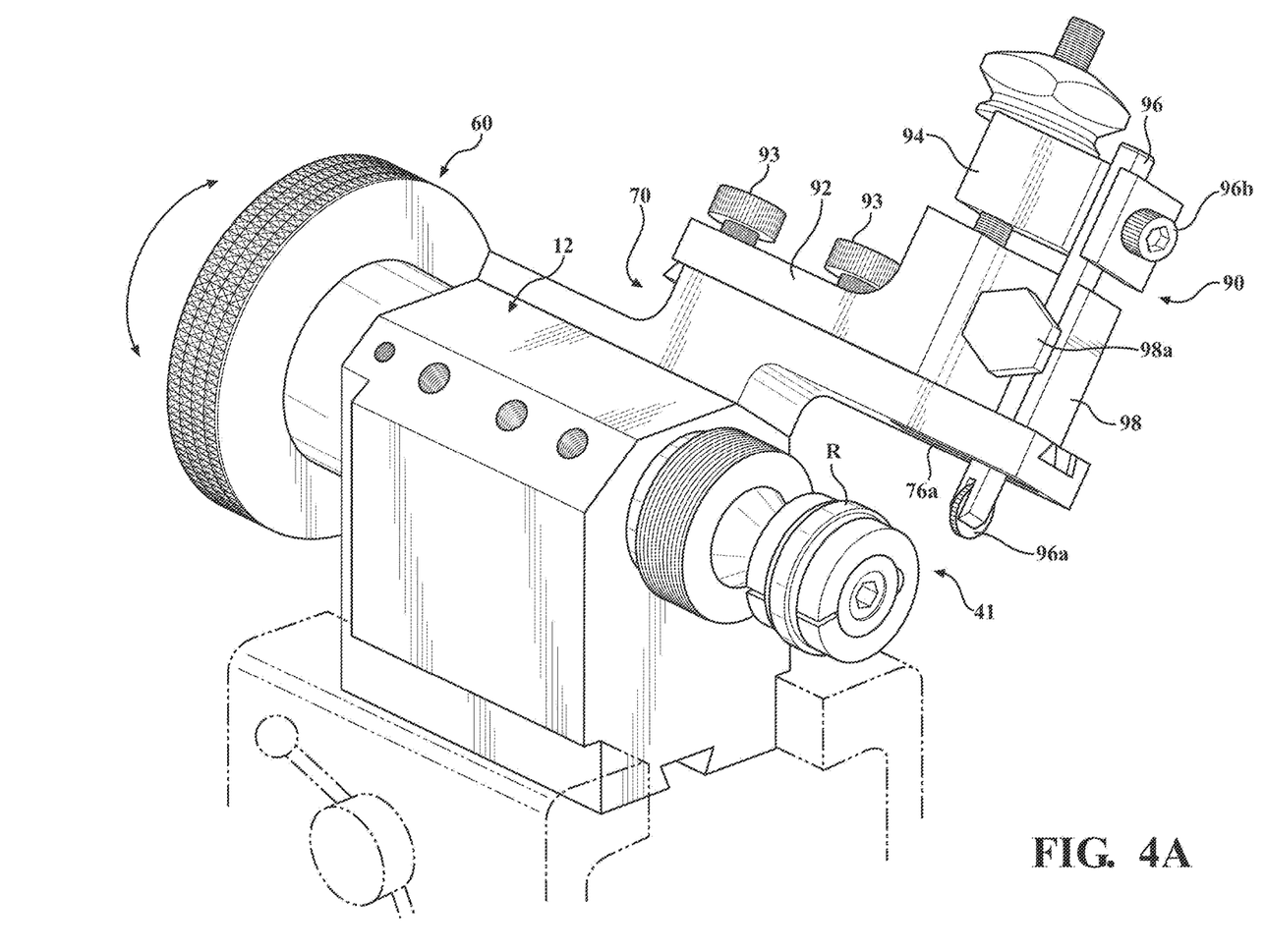
FIG. 4A shows the horizontal knurling tool of FIG. 4 assembled to the tool adapter on the ring holder.

FIGS. 4 and 4A show a knurling tool 90 exploded and mounted to horizontal tool adapter 70, respectively, on ring holder base 12. Knurling tool 90 has a slide-mount body 92 similar to sliding block body 82 on the scribing tool 80 in FIGS. 3-3A, with adjustable locking screws 93 that work in similar fashion to longitudinally secure tool 90 at various positions in groove 76 on adapter 70 relative to a ring R on the mandrel 41. Knurling tool 90 includes a vertical pressure adjustment block 94 adjustable up and down on a screw shaft 94a using an adjustment nut 94b; and a knurling arm 96 slidable in and adjustably secured at its upper end in an open-faced groove 95 on the outer end of pressure block 94 by an outer set screw 96b, and secured at its lower end in an open groove 97 in a lateral pressure adjustment block 98 by an inner lock screw 98a. When mounted on tool adapter 70 as shown in FIG. 4A, the user has simultaneous two-handed control over the knurling pressure and speed as vertically-adjustable force is applied by the knurling arm wheel 96a with one hand through nut 94b to the face of the ring R while the ring is rotated with the other hand using handle 60.

Figure 5:
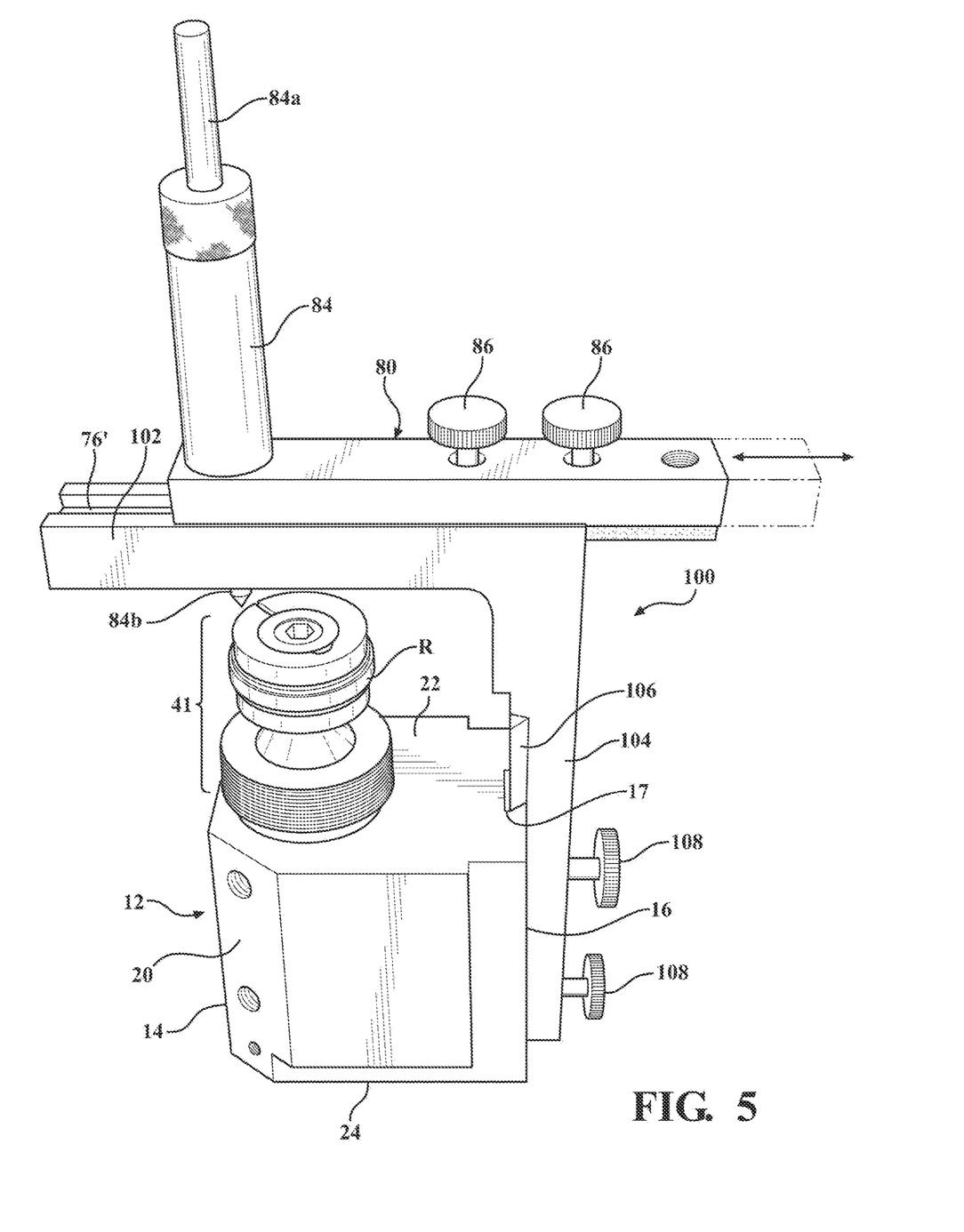
FIG. 5 shows the ring holder base of FIG. 1 in a vertical work orientation with the handle removed, and with a vertical tool adapter and scribe tool assembled thereto.

FIG. 5 shows the ring holder base 12 of FIG. 1 in a vertical work orientation with the handle 60 removed so that rear end face 24 can rest on a flat work surface, and with a vertical tool adapter 100 assembled thereto. Vertical tool adapter 100 includes a tool adapter slide block portion 70' similar to horizontal tool adapter 70 described above, and a vertical mounting arm 104 connected to slide block base 102 and having a dovetail 106 configured to sliding engage a mating dovetail groove 17 on the bottom 16 of ring holder base 12. Locking screws 108 extending through bores in vertical mounting arm 104 selectively engage groove 17 and/or bottom 16 of the ring holder base to adjustably lock adapter 100 in different vertical positions relative to the base 12 and a ring R held on the vertically-oriented mandrel 41. The horizontal tool adapter portion 102 on adapter 100 is essentially the same as tool adapter 70 described above, so that various tools such as scribing tool 80 or knurling tool 90 can be mounted thereon with a selectively lockable sliding fit via screws 86 or 93 in a groove 76' as described above.

Figure 6:
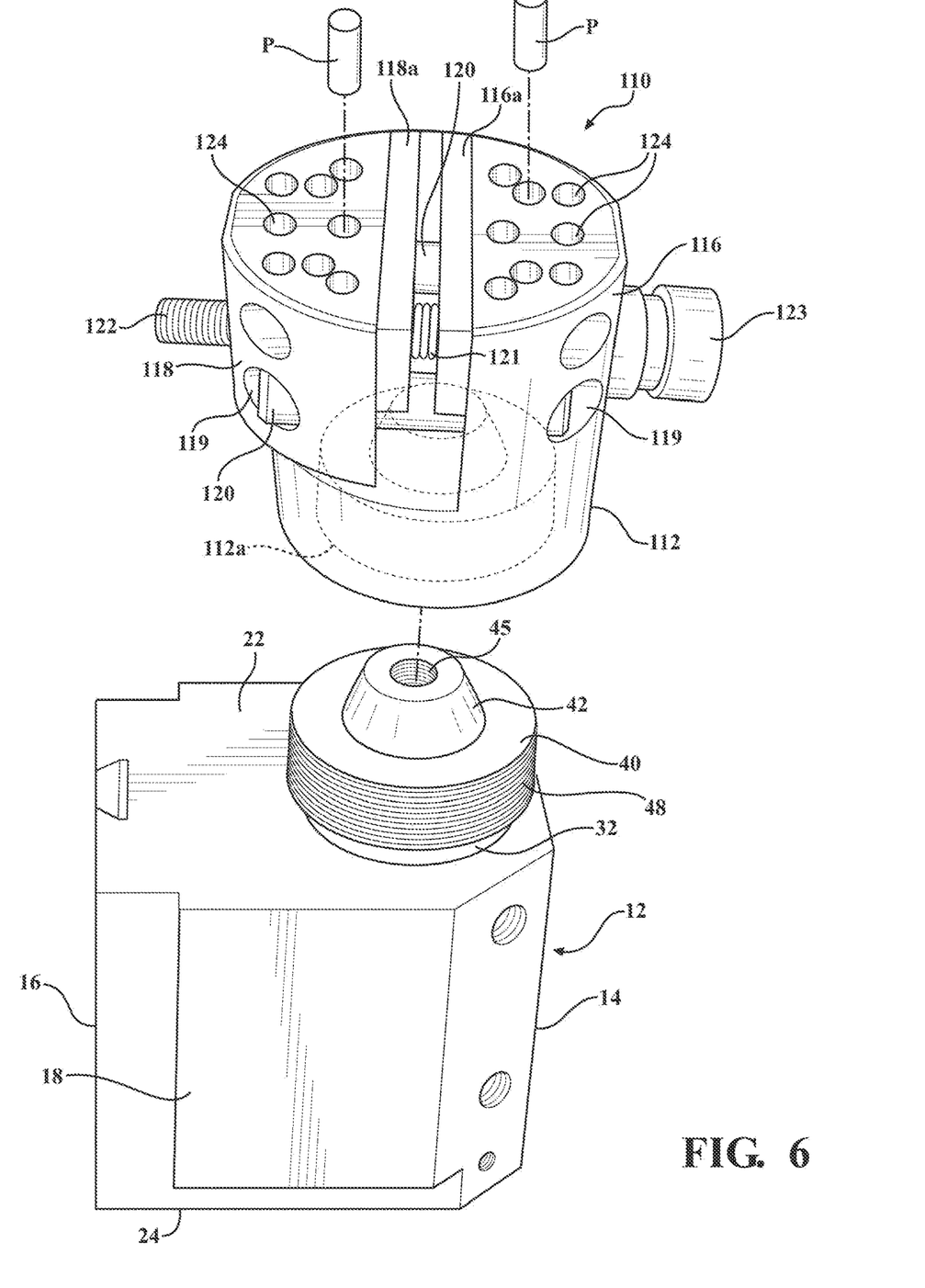
FIG. 6 is similar to FIG. 5, but shows an inventive vise exploded from the mandrel portion of the base.
Figure 6A:
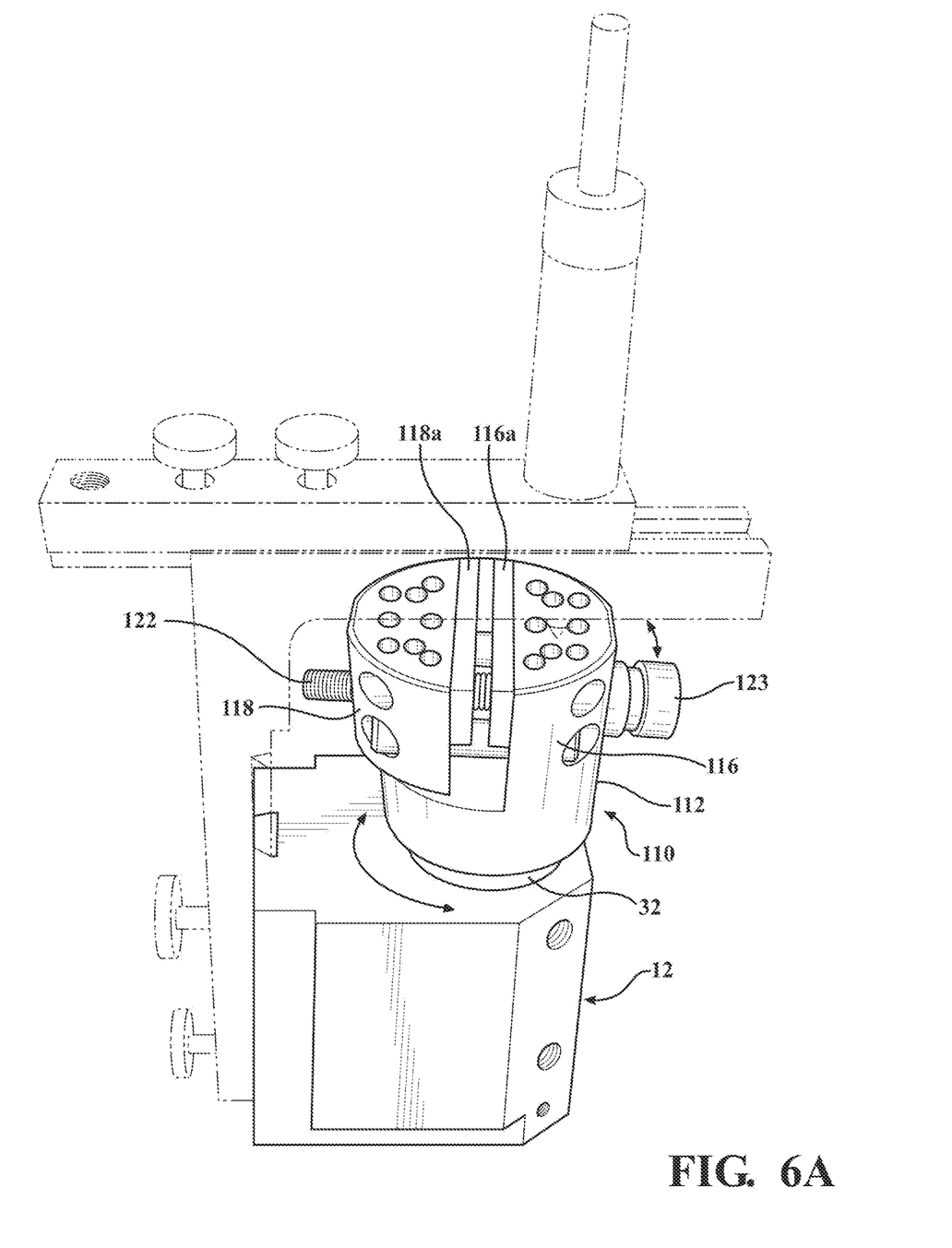
FIG. 6A shows the vise of FIG. 6 assembled to the base.
Figure 6B:
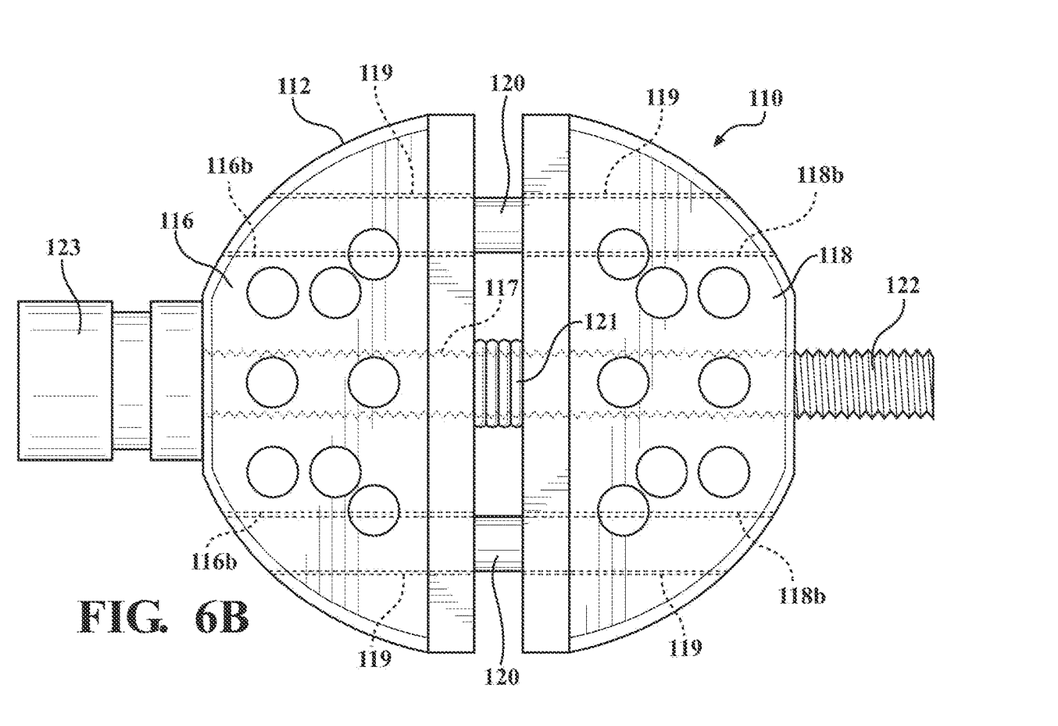
FIG. 6B is a top plan view of the vise of FIG. 6.
Figure 6C:
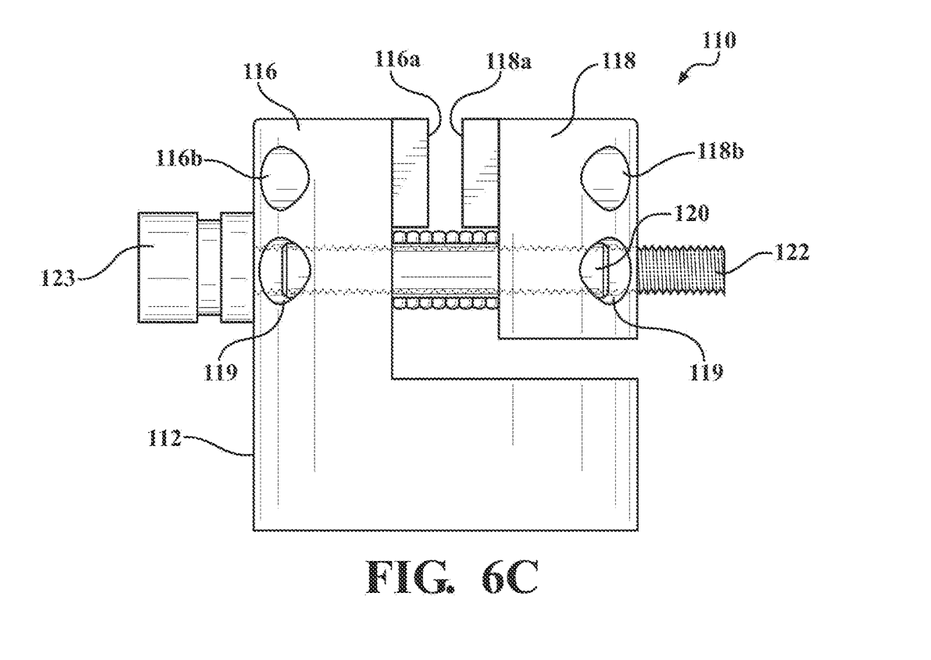
FIG. 6C is a side elevation view of the vise of FIG. 6.

FIGS. 6 through 6C show a rotatable work-holding vise 110 configured to be mounted to mandrel end 40 of rotatable shaft 32 on threaded mounting ring 48 between the mandrel and front end face 22 of ring holder base 12, primarily for use in a vertical work orientation as shown. Vise 110 includes a base 112 having a large threaded bore 112a sized to fit over mandrel base 40 and with threads configured to be mated with threaded mounting ring 48. Once mated to mounting ring 48, vise 110 can be rotated 360° degrees relative to ring holder base 12 on mandrel shaft 32. Vise 110 further includes a fixed jaw 116, in the illustrated example formed as an integral extension of base 112, and a movable jaw 118 movable toward and away from fixed jaw 116 to clamp various workpieces therebetween. The inner clamping faces 116a, 118a of the jaws may be lined with blocks or plates of softer material than the material of the vise base 112 and jaws (preferably stainless steel or aluminum) in order to protect the relatively soft precious metals or other materials of the workpieces, the softer plates 116a, 118a secured with screws or bolts through aligned bores 116b, 118b in their respective jaws. Movable jaw 118 is mounted to slide toward and away from fixed jaw 116 on guide pins 120 extending from fixed jaw 116 through aligned bores 119 in the jaws. The movement of movable jaw 118 is controlled by a screw shaft 122 rotatably journaled at one end in fixed jaw 116 and rotatably threaded into a centered bore 117 in movable jaw 118. Screw shaft 122 may have a knurled or enlarged head 123 that may function as a convenient shaft-rotating handle. The upper faces of jaws 116, 118 are preferably flat and include a plurality of pin-mounting sockets 124 for creating arrays of removable, reconfigurable work-securing pins P in patterns customized for various workpieces in a manner generally known in the art. A compression spring 121 may be provided on shaft 122 between jaws 116, 118 to maintain a spring bias on the threaded adjustment of the jaws.

Figure 7:
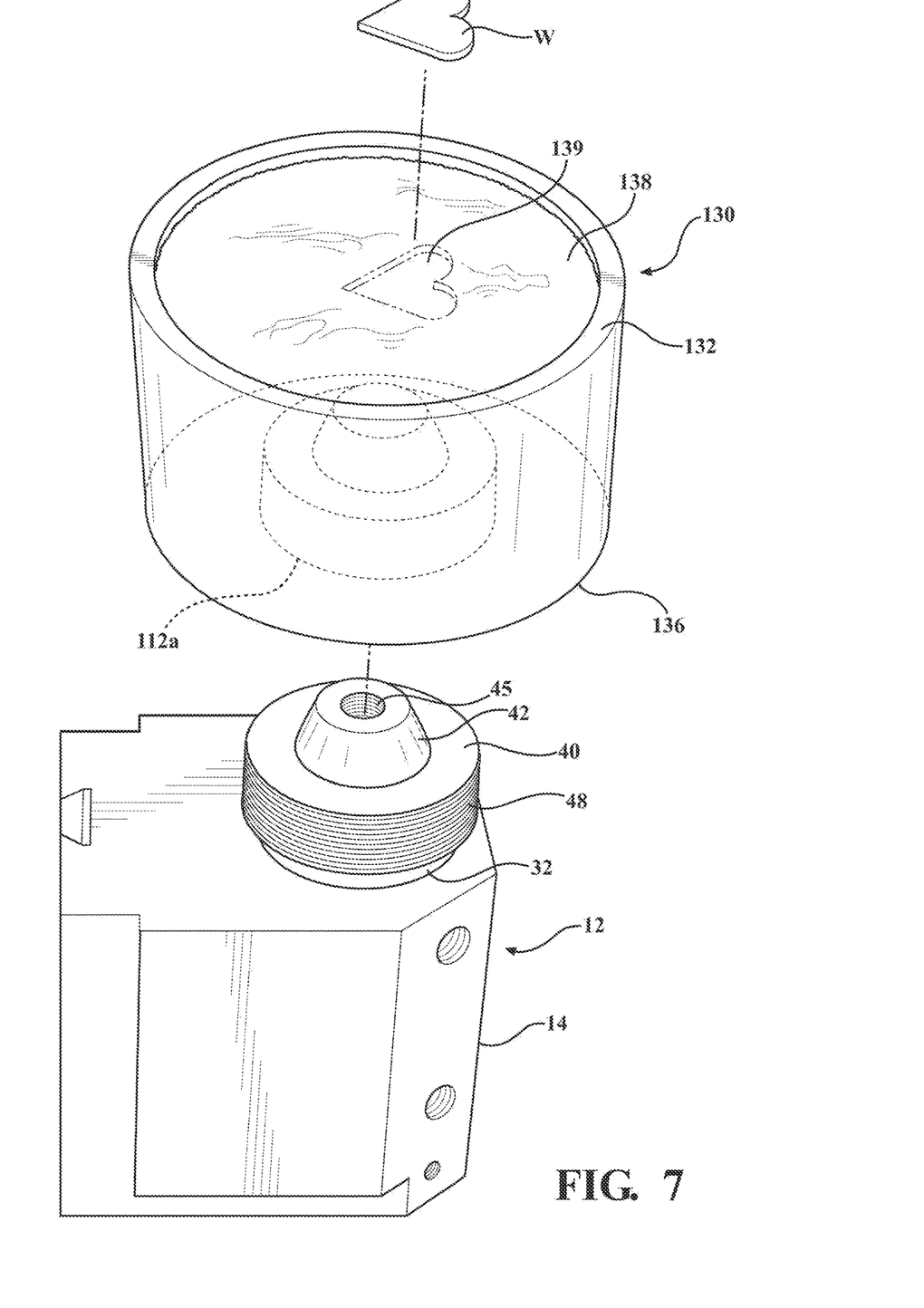
FIG. 7 is similar to FIG. 5, but shows an inventive pitch cup exploded from the mandrel portion of the base.
Figure 7A:
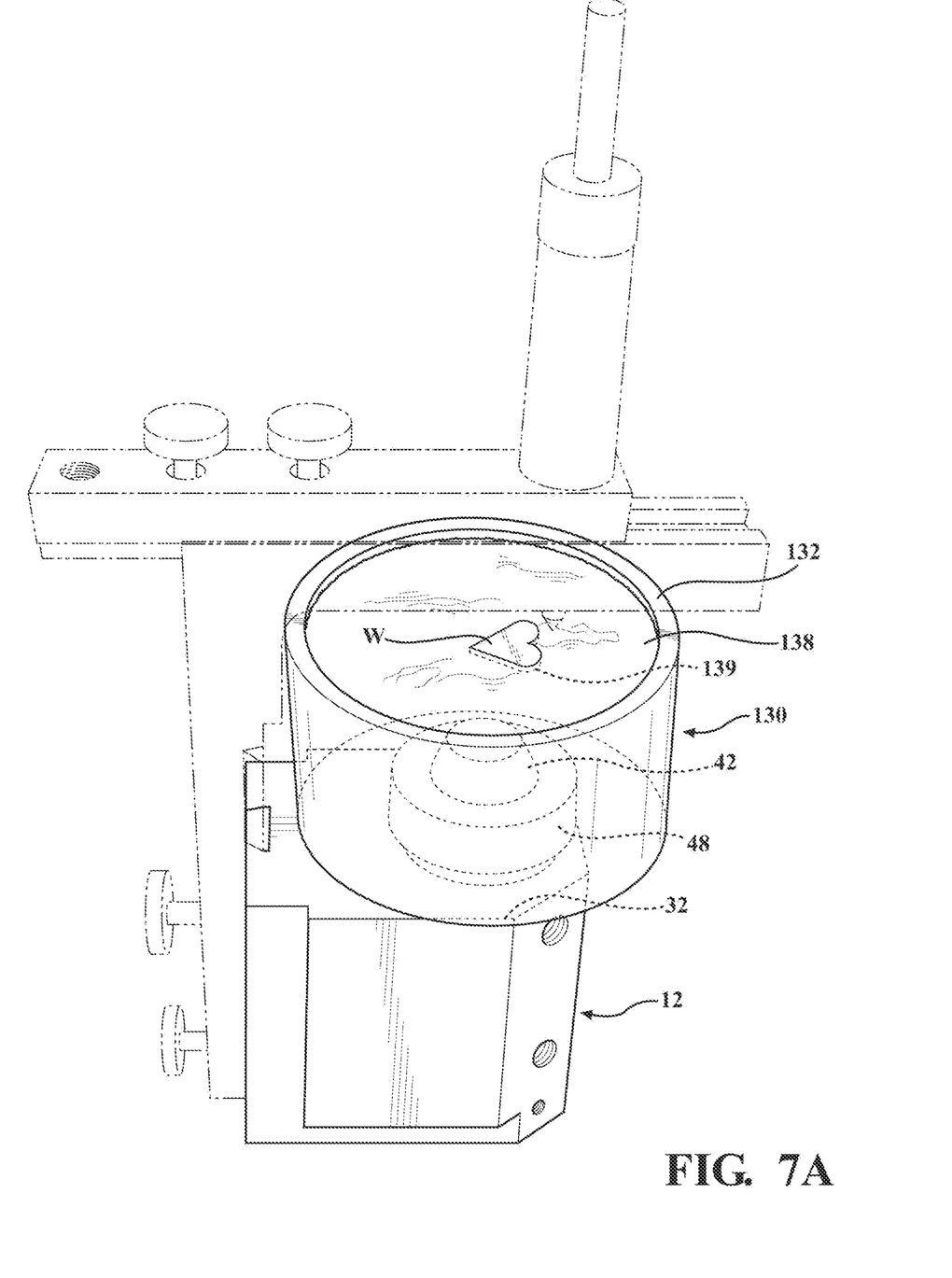
FIG. 7A shows the pitch cup of FIG. 7 assembled to the base.

FIGS. 7 and 7A show a pitch cup 130 configured for rotatable mounting on threaded mounting ring 46 over mandrel base 40 on ring holder base, primarily for use in a vertical work orientation although a more horizontal orientation is possible. Pitch cup 130 has a heat-resistant, open-topped, cup-shaped body 132, e.g. a nylon or Teflon® material, with a large threaded bore 112a on its bottom surface 136 for threading onto threaded base mounting ring 48, in the same manner as vise 110 in FIGS. 6-6C. The bore 112a is preferably recessed into bottom surface 136 so that the pitch cup 130 will rest flat on a flat work surface. The interior of cup-shaped body 132 is filled with a re-heatable, re-useable, low-temperature "pitch" 138 of known type that softens when heated in a microwave (preferred) or in another low temperature heat source so that jewelry or another workpiece W can be embedded in the softened pitch 138. When the pitch returns to room temperature it hardens, securing the workpiece in place in the cup and leaving a mating depression 139 formed in the hardened pitch from which the workpiece W can be removed and then replaced as needed.

The materials used for the various portions of the ring holder system components described above may vary, and suitable materials will be apparent to those skilled in the art. Aluminum, steel, stainless steel, brass, and others are commonly used in ring holding fixtures and will be suitable in various combinations. Some portions of the system may also lend themselves to being made from durable polymer materials, where temperature and/or friction or abrasion are not extreme during use.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A ring holder system comprising:
a ring holder base comprising a main body with a top, a bottom, front and rear end faces, and sides with upper angled mounting surfaces;
a rotatable collet-holding mandrel extending from the front end face of the base, the mandrel mounted in the base on a mandrel shaft extending from the front end face through the main body toward but not beyond the rear end face to be manually rotated by a knob or handle removably connected to the shaft at the rear end face;
a horizontal tool adapter comprising a stepped cantilever beam configured to be secured to one of the angled mounting faces with a free end extending forwardly beyond the front end face of the base to a location above the mandrel, the one of the angled mounting faces comprising a mounting feature for the horizontal tool adapter;
the rear end face being substantially flat so that the rear end face may rest on a surface in a vertical work orientation with the mandrel-rotating handle removed from the mandrel shaft in the base; and,
an L-shaped vertical tool adapter configured to be secured to the bottom of the base when the base is in the vertical work orientation with a tool mounting arm extending horizontally parallel to the front end face over the mandrel, the bottom of the base including a tool-mounting feature for mounting the vertical tool adapter thereon when the base is in the vertical work orientation.

2. The ring holder system of claim 1, wherein the removable handle has a diameter or width greater than a height and/or width of the ring holder base, and further wherein an axis of the mandrel shaft is located above a longitudinal center axis of the main body so that the handle is located above the bottom of the ring holder base.

3. The ring holder system of claim 1, further comprising a threaded mounting ring at an inner end of the mandrel adjacent the front end face of the base, the threaded mounting ring having a diameter greater than a tip of the mandrel extending beyond the threaded mounting ring.

4. The ring holder system of claim 1, further comprising a scribe tool configured to be mounted on one of the horizontal and vertical tool adapters with a longitudinal sliding connection.

5. The ring holder system of claim 1, further comprising a knurling tool configured to be mounted on one of the horizontal and vertical tool adapters with a longitudinal sliding connection.

6. The ring holder system of claim 5, wherein the knurling tool comprises a vertical pressure adjustment block and a lateral pressure adjustment block.

7. The ring holder system of claim 1, further comprising a rotatable work holding vise configured to be mounted to the threaded mounting ring.

8. The ring holder system of claim 1, further comprising a pitch cup configured to be mounted to the threaded mounting ring.

* * * * *